(12) United States Patent
Van Bergen et al.

(10) Patent No.: US 6,882,788 B2
(45) Date of Patent: Apr. 19, 2005

(54) OPTICAL FIBRE

(75) Inventors: Andries Heero Van Bergen, Nuenen (NL); Mattheus Jacobus Nicolaas Van Stralen, Tilburg (NL); Mark Peter Marie Jetten, Weert (NL)

(73) Assignee: Draka Fibre Technology B.V., Eindhoven (NL)

( * ) Notice: Subject to any disclaimer, the term of this patent is extended or adjusted under 35 U.S.C. 154(b) by 0 days.

(21) Appl. No.: 10/176,951

(22) Filed: Jun. 18, 2002

(65) Prior Publication Data

US 2003/0044150 A1 Mar. 6, 2003

(30) Foreign Application Priority Data

Jun. 20, 2001 (NL) .............................................. 1018338

(51) Int. Cl.⁷ ................................................ G02B 6/02
(52) U.S. Cl. ........................ 385/127; 385/123; 385/124
(58) Field of Search ................................. 385/123, 124, 385/126–128

(56) References Cited

U.S. PATENT DOCUMENTS

| | | | |
|---|---|---|---|
| 4,755,022 A | * | 7/1988 | Ohashi et al. .............. 385/127 |
| 5,848,215 A | | 12/1998 | Akasaka et al. ............. 385/123 |
| 6,181,859 B1 | * | 1/2001 | Suzuki et al. ................ 385/128 |
| 6,307,993 B1 | * | 10/2001 | Paek et al. ................... 385/127 |
| 6,449,416 B1 | * | 9/2002 | Lee et al. .................... 385/127 |
| 2002/0021877 A1 | * | 2/2002 | Kyogoku et al. ............ 385/124 |
| 2003/0077057 A1 | * | 4/2003 | Kato et al. ................... 385/123 |

FOREIGN PATENT DOCUMENTS

| | | |
|---|---|---|
| EP | 0 249 230 A1 | 12/1987 |
| EP | 0 689 068 A1 | 12/1995 |
| EP | 0 785 448 A1 | 7/1997 |
| EP | 0 785 488 A1 | 7/1997 |
| EP | 1 037 074 A1 | 9/2000 |
| WO | WO 99/11391 | 3/1999 |

* cited by examiner

Primary Examiner—Ellen E. Kim
(74) Attorney, Agent, or Firm—Seed IP Law Group PLLC

(57) ABSTRACT

The present invention relates to an optical fibre mainly consisting of silica glass, which fibre comprises:

i) an inner core having a first refractive index $n1$ and a first diameter $a$;
ii) an outer core surrounding the outer circumference of the inner core and having a second refractive index $n2$ and a second diameter $b$; and
iii) a cladding surrounding the outer circumference of the outer core, which cladding has a third refractive index $n3$, wherein $n1 > n2 > n3$.

8 Claims, 2 Drawing Sheets

OPTICAL FIBRE

TECHNICAL FIELD

The present invention relates to an optical fibre mainly consisting of silica glass, which fibre comprises:

i) an inner core having a first refractive index n1 and a first diameter a;

ii) an outer core surrounding the outer circumference of the inner core and having a second refractive index n2 and a second diameter b; and iii) a cladding surrounding the outer circumference of the outer core, which cladding has a third refractive index n3, wherein n1>n2>n3.

BACKGROUND INFORMATION

European patent application No 0 249 230 relates to a single mode optical fibre having a zero dispersion wavelength in the wavelength range of 1500 nm–1600 nm, which optical fibre comprises a core consisting of an inner core of $GeO_2$—$SiO_2$ or $GeO_2$—F—$SiO_2$, and an outer core of F—$SiO_2$, and a cladding of F—$SiO_2$.

U.S. Pat. No. 5,848,215 relates to an optical fibre wherein the chromatic dispersion for the intended wavelength of 1550 nm of optical communications signals becomes zero over the entire fibre length as a result of the relative refractive index difference of the optical fibre and the core radius being increased or decreased in the same direction.

Such an optical fibre is furthermore known from European patent application No 0 785 448, which fibre must preferably meet a number of preconditions, in particular a/b<0.20 and b>15 μm. Such a fibre has the zero dispersion wavelength thereof within the range of at least 1560 nm, but not exceeding 1600 nm, which value is slightly shifted relative to the wavelength of the signal light (1.5 μm). The optical fibre that is known therefrom moreover has an MFD value not lower than 8.0 μm so as to decrease the optical power density without decreasing the signal intensity as a whole. In addition to that, the optical fibre that is known therefrom has a so-called cutoff wavelength of at least 1.0 μm but not more than 1.8 μm if the length thereof is 2 m. Moreover, all the examples described in European patent application No 0 785 448 exhibit a so-called zero dispersion higher than 1550 nm, which points to negative dispersion fibres. No mention is made of bending losses.

According to the usual method, an optical fibre having a predetermined external diameter is produced by heating one end of a bar-shaped preform and subsequently drawing the optical fibre from the plasticized end thereof. In an optical fibre that has been obtained in this manner, however, the cross-section of the core parts and the surrounding layers will exhibit a slightly ellipsoid or disturbed circular shape, which makes it difficult to obtain a perfectly circular concentric shape. Accordingly, the refractive index distribution in the direction of the diameter of the optical fibre thus obtained is not perfectly concentric, which leads to an increase of the so-called polarization mode dispersion (PMD). Thus, the "polarization mode dispersion" is a dispersion which occurs as a result of a difference in speed between two polarizations being orthogonal with respect to each other in a cross-sectional portion of an optical fibre. The influence of the aforesaid polarization mode dispersion is great if such optical fibres are used for long-distance transmission, which requires a large capacity over a long-distance. In addition, the influence of the polarization mode dispersion at high transmission rates per channel is considerable.

For some time optical fibres have been in use which are used in the transmission window at 1550 nm. These so-called dispersion shifted fibres (DSF) make use of the intrinsically low attenuation level of the fibre at wavelengths in the so-called C-band (1530–1565 nm), and in addition they have a shifted zero dispersion in the C-band so as to counteract widening of the transmission pulse due to chirping. Generally, Wavelength Division Multiplexing (WDM) is used for increasing the capacity of a glass fibre, in which several wavelengths in the same transmission window are processed for simultaneous transmission of data over a glass fibre. When WDM and high transmission rates are used, so-called non linear effects may have an adverse effect on the transmission capacity. These non-linear effects are Four Waving Mixing (FWM), Self-Phase Modulation (SPM), Cross Phase Modulation (XPM) and Parametric Gain (PG). Since FWM mainly occurs with zero or near zero dispersion, the known WDM fibres exhibit a low dispersion deviating from zero in the C-band. SPM is counteracted by increasing the effective fibre area. As a result, the intensity of the light to be transmitted in the fibre is reduced. One drawback of increasing the effective area is that the dispersion gradient of the fibre will increase. Consequently, the usability of the fibre at the edges of the transmission range is limited as a result of the dispersion being too high of too low. This leads to a serious limitation as regards the use of said fibres in transmission ranges outside the C-band, which ranges are being given a great deal of attention with a view to increasing the transmission capacity of a single fibre even further, such as the L-band (1565–1625 nm) or the S-band (1440–1530 nm). Solutions for the trade-off between dispersion gradient and effective area are thus sought in profiles in which the central portion of the light transmitting core has a lower refractive index, frequently in combination with an index ring in the cladding. Because of the large number of geometric properties that are to be controlled, such profiles are difficult to reproduce and to produce with a sufficient yield, however. Furthermore, the risk of deviations in the circular symmetry increases, which has an adverse effect on the Polarisation Mode Dispersion (PMD). In addition to that it is difficult to keep the bending losses, which play a role upon installation of a fibre, sufficiently low when using such profiles.

SUMMARY OF THE INVENTION

According to one aspect of the invention, an optical fibre mainly consisting of silica glass is provided. The fibre includes:

i) an inner core having a first refractive index n1 and a first diameter a;

ii) an outer core surrounding the outer circumference of the inner core and having a second refractive index n2 and a second diameter b; and iii) a cladding surrounding the outer circumference of the outer core, which cladding has a third refractive index n3, wherein n1>n2>n3, characterized in that the optical fibre has a zero dispersion wavelength of less than 1500 nm, and in that it meets the following requirements:

$0.2 < a/b < 0.55$ $0.05 < D2/D1 < 0.3$ wherein:

$D2 = ((n2-n0)/n2) * 100\%$ $D1 = ((n1-n0)/n1) * 100\%$ n0=refractive index value undoped silica glass n1=refractive index value doped inner core n2=refractive index value doped outer core, wherein the refractive index n1 is substantially constant in an area surrounding the central axis of symmetry.

DETAILED DESCRIPTION

Figure 1:
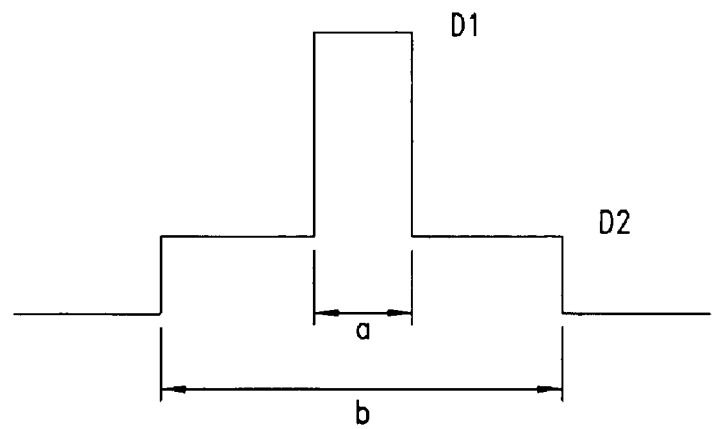
FIG. 1 schematically shows a stepped refractive index profile in which the refractive index in the inner core is substantially constant over the entire distance thereof.

The object of the present invention is thus to provide a fibre having a profile which can be produced in a readily reproducible manner, which fibre is in particular suitable for WDM applications.

The invention as referred to in the introduction is according to the present invention characterized in that the optical fibre has a zero dispersion wavelength of less than 1500 nm, and in that it meets the following requirements:

$$0.2 < a/b < 0.55$$

$$0.05 < D2/D1 < 0.3$$

wherein:

D2=((n2−n0)/n2)*100%

D1=((n1−n0)/n1)*100% n0=refractive index value undoped silica glass n1=refractive index value doped inner core n2=refractive index value doped outer core.

By suitably selecting both the proportion a/b and the proportion D2/D1, an optical fibre is obtained which is especially suitable for WDM applications. The advantage of such a profile is that it is potentially less sensitive to PMD and macro bending, in which it is possible, if desired, to decrease the sensitivity to PMD even further by means of dopes.

The profile that applies in the present invention is defined by the parameters as mentioned above. In that connection it can furthermore be mentioned that the refractive index value may be constant in the area having diameter a, wherein it is desirable in a specific embodiment, however, for the refractive index to have a maximum value in the area having diameter a that surrounds the central axis of symmetry, which maximum value decreases substantially linearly to a value $n_1'$ towards the outer core, wherein $n_1 > n_1' > n_2$. In a specific embodiment it is furthermore desirable for the refractive index to have a maximum value in the area having diameter a surrounding the central axis of symmetry, which maximum value decreases substantially linearly to the value $n_2$ towards the outer core. In specific circumstances it may furthermore be desirable to use an embodiment in which the refractive index value $n_1$ is substantially constant in the area having a diameter a' surrounding the central axis of symmetry, which refractive index value subsequently decreases substantially linearly to a value $n_1'$ over a distance a towards the outer core, wherein a'<a<b and $n_1 > n_1' > n_2$. Moreover, a special embodiment is desirable in which the refractive index value is constant in the area having diameter a' surrounding the central axis of symmetry, which refractive index value decreases substantially linearly to a value $n_2$ over a distance a towards the outer core, wherein a'<a<b and $n_1 > n_2$.

The present optical fibre has a so-called dual shape core profile, wherein the core consists of a central portion having a high refractive index value and, adjacently thereto, a surrounding ring having a lower refractive index. The refractive index values of the core and the adjacent surrounding ring are higher than those of the cladding, which cladding surrounds the ring. The increase of the refractive index of the core relative to the surrounding layers is effected by doping the silica core with $GeO_2$. In a special embodiment, both the core and a part of the inner core surrounding the core are doped with fluor.

In a particularly preferred embodiment, the present optical fibre furthermore meets the requirement:

$$2\ ps/(nm.km) <= \text{dispersion at } 1550\ nm <= 10\ ps/(nm.km).$$

The non-linear effect FWM increases strongly when the dispersion of the optical fibre approaches a value zero. Because it is very difficult in a transmission system to compensate for such non-linear effects, it is desirable for the dispersion to take place within the aforesaid range.

In a special embodiment, the present optical fibre furthermore preferably meets the requirement:

$$\text{dispersion gradient at } 1550\ nm <= 0.095\ ps/(nm^2.km).$$

A dispersion gradient which meets the above requirement is in particular desirable because the dispersion at the edge of the transmission band will differ strongly from the dispersion in the centre thereof if the gradient is too high. In addition, such a difference in dispersion is difficult in a transmission system and it can only be compensated at high cost, so that it is desirable that the aforesaid requirement as regards the dispersion gradient be met.

In a special embodiment it is furthermore desirable for the present optical fibre to meet the requirement:

$$7.5 <= MFD <= 9.5$$

If the mode field diameter (MFD) is lower than 7.5, the light intensity in the optical fibre will increase, as a consequence of which the optical fibre will be adversely affected by the undesirable non-linear effect SPM. A mode field diameter higher than 9.5, however, will lead to problems with the dispersion gradient, which value will also become higher, which is thus undesirable.

In another preferred embodiment, it is in particular preferable for the optical fibre to meet the requirement:

$$\text{cutoff wavelength} < 1450\ nm$$

In a special embodiment of the present invention, the inner core and part of the outer core are doped with fluor. This manner of doping makes it possible to maintain the circular symmetry of the fibre in a reproducible manner, because the collapsing process, in which the hollow bar is converted into a massive bar, is easier to control.

It is in particular preferable if the present optical fibre comprises one or more additional layers present on the cladding, wherein the E-modulus of the first additional layer is lower than 5 MPA at a temperature of 20° C. and wherein that of the second additional layer is higher than 500 MPA.

Such fibres appear to have very good macro bending properties, which properties can only be observed when at least 100 bindings are arranged on a drum having a diameter of 30 mm. The experimentally determined macro bending values with 100 bindings on such a drum are lower than 10 dB/km.

The present invention will be explained in more detail hereinafter with reference to a number of figures, which figures do not constitute a limitation of the scope of the invention, however.

FIGS. 1–5 are refractive index profiles according to the present invention.

FIG. 1 schematically shows a stepped refractive index profile of the present optical fibre, in which the refractive index in the inner core having diameter a is substantially constant over the entire distance thereof.

Figure 2:
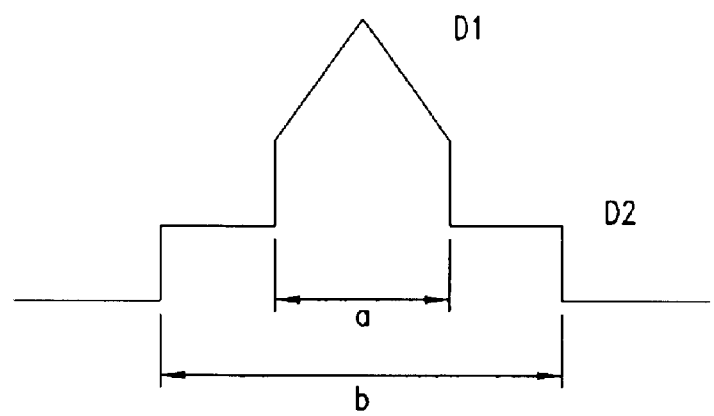
FIG. 2 schematically shows a refractive index profile in which an inner core has a maximum refractive index value in the area surrounding the central axis of symmetry.

In FIG. 2, the inner core has a maximum refractive index value in the area surrounding the central axis of symmetry, which maximum refractive index decreases towards the outer core to a value $n_1'$, wherein $n_1 > n_1' > n_2$.

Figure 3:
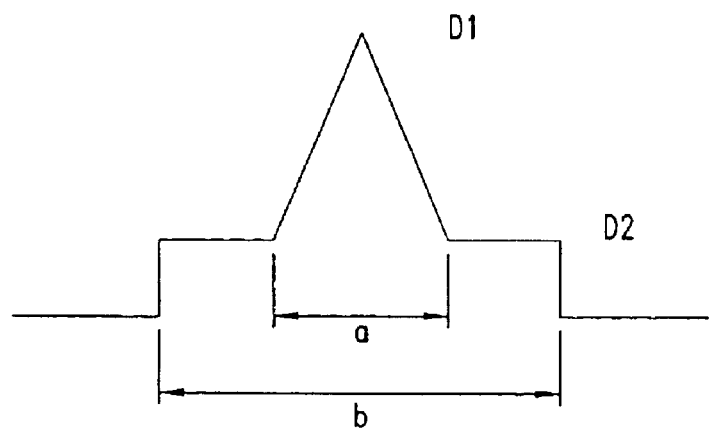
FIG. 3 schematically shows a refractive index profile in which an inner core has a maximum refractive index value in the area surrounding the central axis of symmetry.

In FIG. 3, the inner core has a maximum refractive index value in the area surrounding the central axis of symmetry, which maximum refractive index value $n_1$ decreases to a value $n_2$ from the central axis of symmetry towards the outer core.

Figure 4:
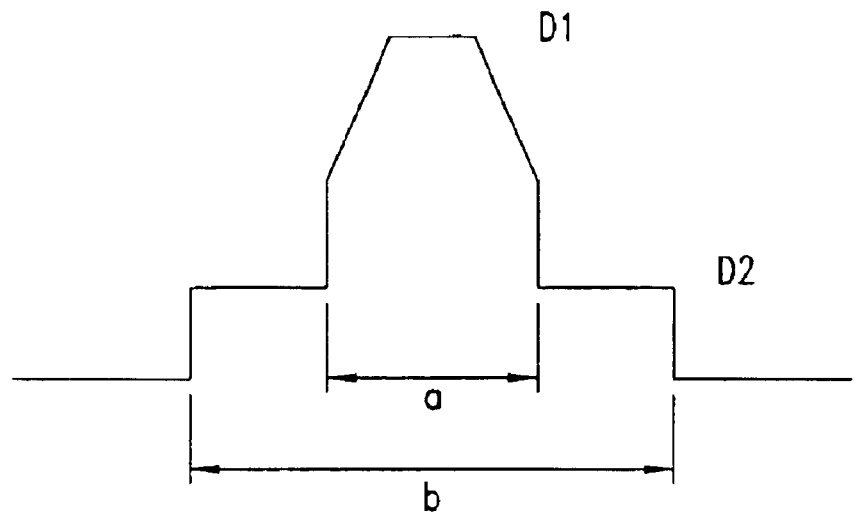
FIG. 4 schematically shows a refractive index profile in which an inner core has a substantially constant refractive index value in the area surrounding the central axis of symmetry.

In FIG. 4, the inner core has a maximum refractive index value in the area having diameter a' that surrounds the central axis of symmetry. This maximum refractive index value $n_1$ subsequently decreases towards the outer core, to a value $n_1'$ in the area having diameter a, wherein a'<a<b and $n_1 > n_1' > n_2$.

Figure 5:
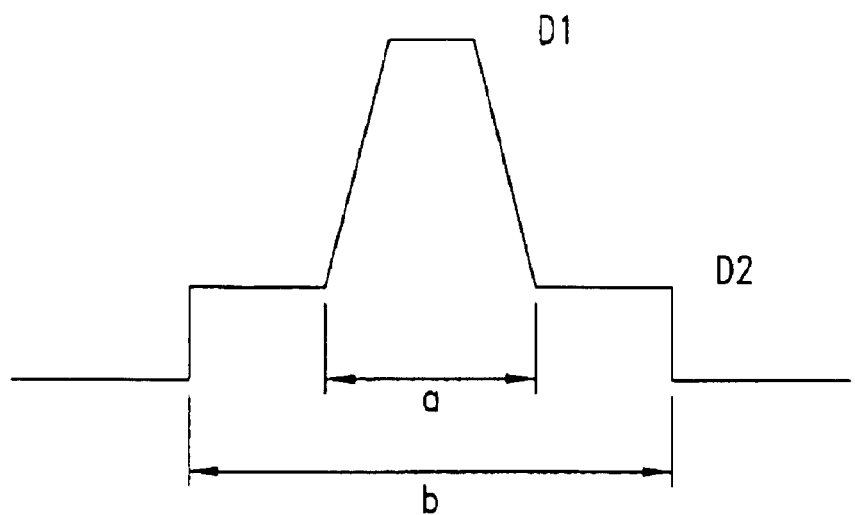
FIG. 5 schematically shows a refractive index profile in which an inner core has a substantially constant refractive index value in the area surrounding the central axis of symmetry.

FIG. 5 shows a refractive index profile in which the inner core has a maximum refractive index value in an area surrounding the central axis of symmetry, which area has a diameter a'. The maximum refractive index value $n_1$ decreases towards the outer core to a value $n_2$ in the area having diameter a, wherein $n_1 > n_2$ and a'<a<b.

What is claimed is:

1. An optical fibre mainly consisting of silica glass, which fibre comprises:
   i) an inner core having a first refractive index n1 and a first diameter a;
   ii) an outer core surrounding the outer circumference of the inner core and having a second refractive index n2 and a second diameter b; and
   iii) a cladding surrounding the outer circumference of the outer core, which cladding has a third refractive index n3, wherein n1>n2>n3, characterized in that the optical fibre has a zero dispersion wavelength of less than 1500 nm, and in that it meets the following requirements:

$0.2 < a/b < 0.55$ $0.05 < D2/D1 < 0.3$ wherein:
   D2=((n2−n0)/n2)*100%
   D1=((n1−n0)/n1)*100%
   n0=refractive index value undoped silica glass
   n1=refractive index value doped inner core
   n2=refractive index value doped outer core,
wherein the refractive index n1 is substantially constant in an area surrounding the central axis of symmetry having diameter a', wherein this maximum refractive index n1 decreases towards the outer core to a value n2 in an area having diameter a, wherein n1>n2 and a'<a<b.

2. An optical fibre according to claim 1, characterized in that the optical fibre furthermore meets the requirement:

$2\ ps/(nm.km) <= \text{dispersion at } 1550\ nm <= 10\ ps/(nm.km)$.

3. An optical fibre according to claim 1, characterized in that the optical fibre furthermore meets the requirement:

dispersion gradient at 1550 $nm <= 0.095\ ps/(nm^2.km)$.

4. An optical fibre according to claim 1, characterized in that the optical fibre furthermore meets the requirement:

$7.5 <= MFD <= 9.5$.

5. An optical fibre according to claim 1, characterized in that the optical fibre furthermore meets the requirement:

cutoff wavelength<1450 nm.

6. An optical fibre according to claim 1, characterized in that part of the cladding is doped with fluor, which doped part of the cladding lies directly adjacently to the outer circumference of the outer core.

7. An optical fibre according to claim 1, characterized in that one or more additional layers are present on the cladding, wherein the E-modulus of the first additional layer is lower than 5 MPa at 20° C. and that of the second additional layer is higher than 500 Mpa.

8. An optical fibre formed from a silica glass material, the fibre comprising:
   i) an inner core having a first refractive index n1 and a first diameter a;
   ii) an outer core surrounding the outer circumference of the inner core and having a second refractive index n2 and a second diameter b; and
   iii) a cladding surrounding the outer circumference of the outer core, which cladding has a third refractive index n3, wherein n1>n2>n3, characterized in that the optical fibre has a zero dispersion wavelength of less than 1500 nm, and in that it meets the following requirements:

$0.2 < a/b < 0.55$ $0.05 < D2/D1 < 0.3$ wherein
   D2=((n2−n0)/n2)*100%
   D1=((n1−n0)/n1)*100%
   n0=refractive index value undoped silica glass
   n1=refractive index value doped inner core
   n2=refractive index value doped outer core,
wherein the refractive index n1 is substantially constant in an area surrounding the central axis of symmetry having diameter a', wherein this maximum refractive index n1 subsequently decreases towards the outer core, to a value n1' at the diameter a, wherein a'<a<b and n1>n1'>n2.

* * * * *